Dec. 6, 1938.　　　　　G. DEN BESTEN　　　　　2,138,841

TRACTOR STOP HITCH

Filed June 12, 1935　　　3 Sheets-Sheet 1

Inventor
Gerrit Den Besten
By Liverance and Van Antwerp
Attorneys

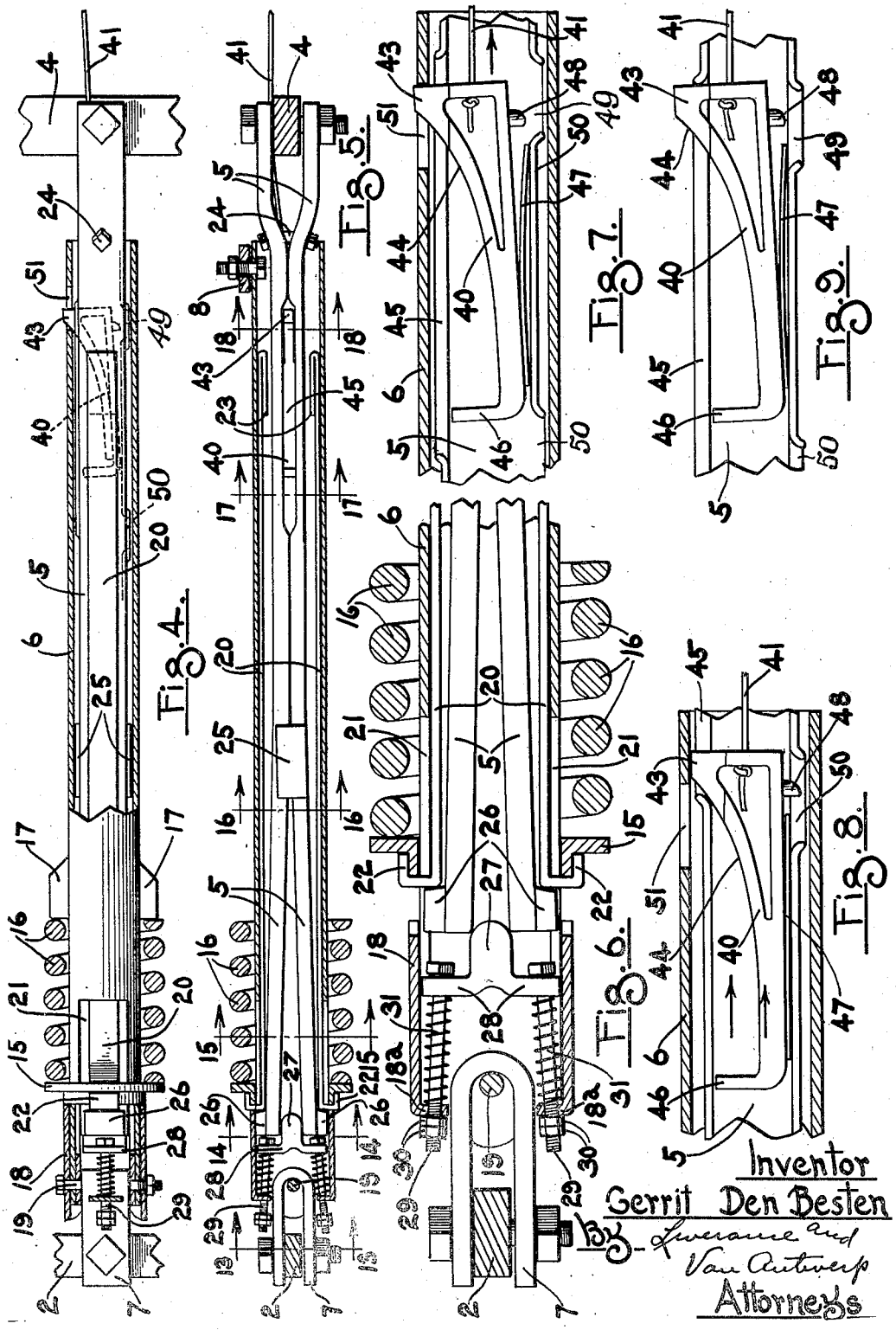

Dec. 6, 1938.  G. DEN BESTEN  2,138,841
TRACTOR STOP HITCH
Filed June 12, 1935  3 Sheets-Sheet 3
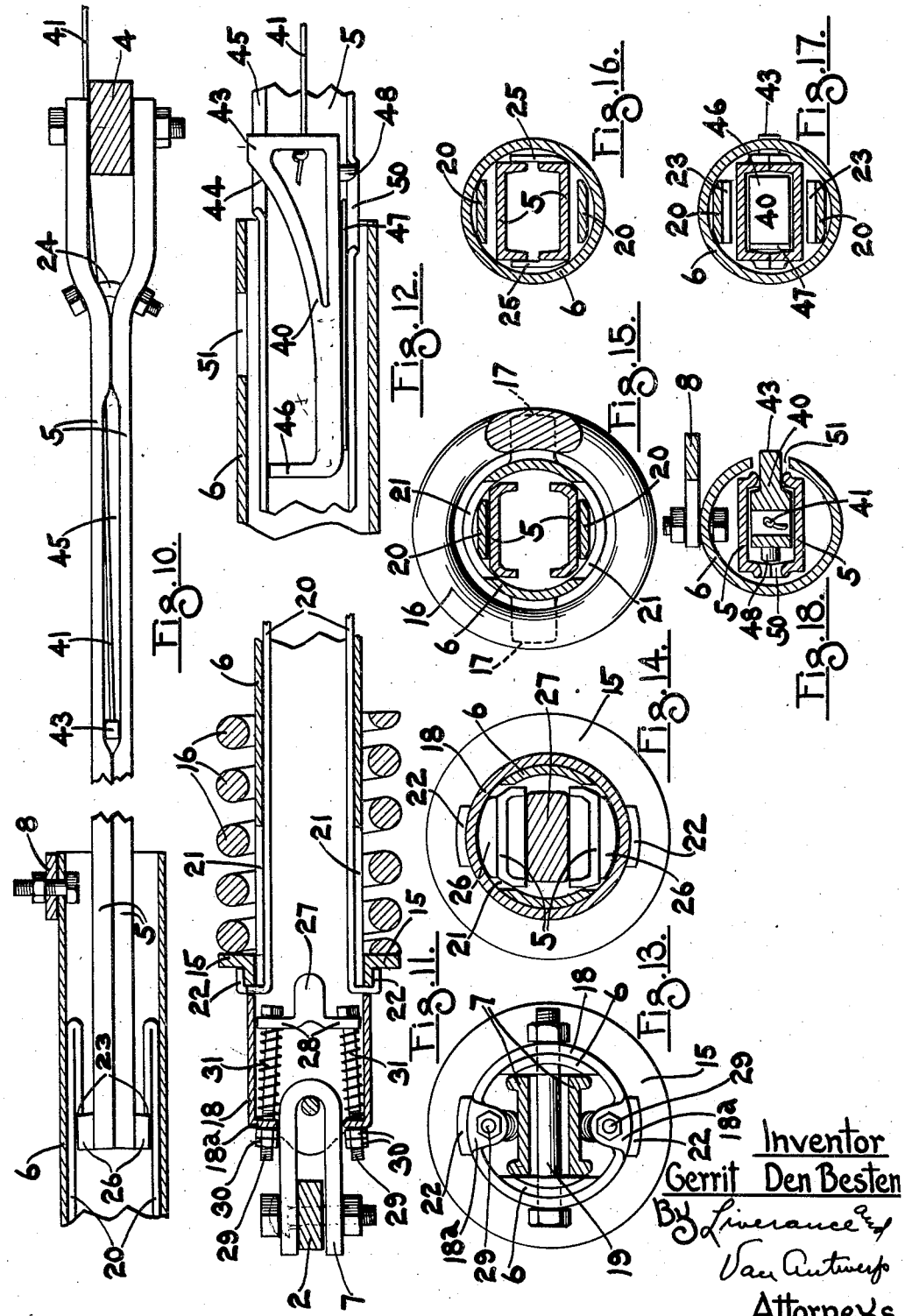
Inventor
Gerrit Den Besten
By Liverance &
Van Antwerp
Attorneys Patented Dec. 6, 1938

2,138,841

UNITED STATES PATENT OFFICE 2,138,841

TRACTOR STOP HITCH

Gerrit Den Besten, Corsica, S. Dak., assignor of one-fourth to Liverance & Van Antwerp, Grand Rapids, Mich., a copartnership composed of Frank E. Liverance, Jr., and Harold O. Van Antwerp Application June 12, 1935, Serial No. 26,230

22 Claims. (Cl. 180—14.5)

This invention relates to hitches for tractors of the type which may be termed a tractor stop hitch. In agricultural work, in which a tractor is used to pull an implement such as a plow through the field, it is desirable to provide a hitch connection between the tractor and the implement which will yield when the implement strikes an obstacle in the field and exerts an abnormal strain which would tend to break the implement if continued and to automatically stop the tractor under such conditions.

This invention provides a hitch connection between the tractor and the implement which will pull the implement under ordinary conditions but which will yield under abnormal strain and will permit the tractor to travel free of the implement for a short distance and at the same time will automatically disengage the clutch of the tractor so that it will stop traveling. The hitch is constructed so that reverse travel of the tractor will automatically reengage the hitch parts to enable the tractor to again take up its load to pull the implement.

The hitch, by a simple modification, is adapted to function with either of two commonly used types of clutch throw-out levers, one of which may be termed the "snap action" type, in which the clutch lever tends to remain in either the cutch engaged or clutch disengaged position, and the other of which is of the "automobile" type, in which the clutch lever tends to move to clutch engaged position and must be held against this tendency to hold the clutch disengaged.

The invention provides various novel features of construction and arrangement as hereinafter more fully described and particularly pointed out in the claims, reference being had to the accompanying drawings in which, Fig. 1 is a diagrammatic elevation of a tractor stop hitch embodying this invention shown applied in operative position to a plow and a tractor having the snap action type clutch lever.

Fig. 4 is a longitudinal plan view, partially in section, of the tractor stop hitch.

Fig. 5 is a sectional elevation of the same.

Figs. 6 and 7 are enlarged sectional views of the rear and forward portion of the hitch respectively showing it in position just prior to disengagement.

Figs. 8 and 9 show the parts of Fig. 7 in intermediate positions of operation.

Fig. 10 is a fragmentary elevation with parts broken away showing the drawbar of the hitch extended to its limit of movement.

Fig. 11 is an elevation of the rear end of the hitch with the drawbar removed from it by extension, as in Fig. 10.

Figure 1:
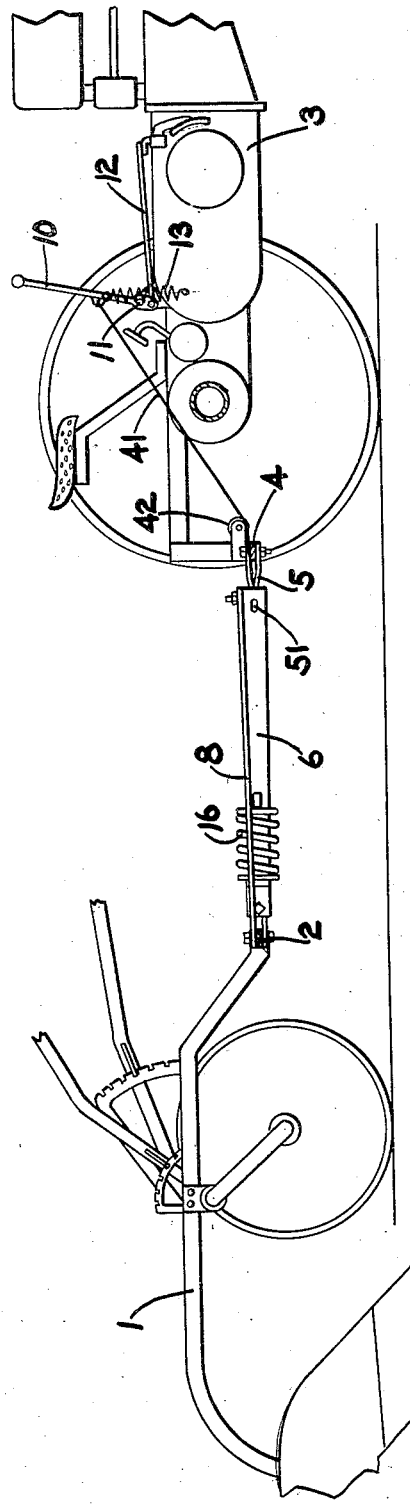

Fig. 12 illustrates the clutch throw-out anchor and associated parts modified to operate with the automobile type of clutch lever, and Figs. 13, 14, 15, 16, 17 and 18 are respectively transverse sections on the lines 13—13, 14—14, 15—15, 16—16, 17—17 and 18—18 of Fig. 5.

Like numbers refer to like parts in all of the figures.

1 represents a plow or other implement to be drawn by the tractor and having a beam 2 by means of which it is hitched to the tractor. 3 represents a tractor having a beam 4 to which the hitch is connected to draw the implement. The tractor stop hitch has a drawbar 5 connected to the beam 4 of the tractor and a casing 6 connected by a clevis 7 to the beam 2 of the plow. A diagonal brace bar 8 extends from the beam 2 of the plow to the forward end of the casing 6 to maintain the angular relation of the casing to the plow.

The tractor stop hitch is adapted to operate, with a minor modification, either with the snap type clutch lever or the automobile type clutch lever and will be first described and considered in connection with the snap type lever as illustrated in Fig. 1. The tractor has a conventional clutch which serves to connect or disconnect the engine with the wheel driving mechanism and the clutch is moved to either engaged or disengaged position by the clutch lever 10 which is pivoted at 11 and has its lower end connected by a rod 12 with the clutch actuating members. This type of clutch will remain in either engaged or disengaged position and to accomplish this the spring 13 is connected to the clutch lever at one side of its pivot and anchored to a fixed part of the tractor at the opposite side of the pivot and swings from one side of the pivot to the other in its respective movements. Fig. 1 illustrates the clutch lever in clutch engaged position.

The housing 6 of the hitch, which is shown cylindrical in shape, is surrounded near its rear end by a longitudinally slidable collar 15. A coil spring 16 surrounds the casing 6 ahead of the collar 15 and seats at its forward end against stops 17 projecting from and fastened to the casing 6. A ferrule 18 surrounds the casing 6 at its rear and serves as a rear stop for the collar 15. The ferrule 18 is fastened to the casing 6 by a bolt 19, which extends diametrically through the ferrule and through the casing and also serves as an anchor for the clevis 7 by means of which the casing is attached to the beam 2 of the plow.

The collar 15, cushioned by the spring 16, is the load transmitting member between the drawbar 5 attached to the tractor and the casing 6 attached to the implement. Pull straps 20 are attached at their rear ends to the collar 15 and these ends are abutted by lugs 26 on the drawbar 5 and through them the load is applied to the collar 15. The rear ends of the straps 20 extend through longitudinally elongated slots 21 diametrically opposite each other at the rear end of the casing 6 and are hooked on to the collar 15 at 22. The straps 20 extend forwardly within the casing nearly to its forward end and are return bent to form shoulders 23. These straps 20 will move longitudinally within the casing within the range of yieldability of the spring 16.

The drawbar 5, as illustrated, comprises two parallel juxtaposed members separated at their forward ends to constitute a bifurcated member which embraces and is attached to the beam 4 of the tractor. The two members of the drawbar are connected near their forward ends to each other by a bolt 24 and intermediate their ends are guided by lap plates 25 to retain them in proper relationship to each other. Their rear ends are sprung so that they will normally tend to separate as illustrated in Fig. 5 and at their rear ends they are provided with lugs 26 having forward shoulders to engage the pull straps 20 either at their rear ends or forward ends to transmit the load. The two members 5 of the drawbar are sufficiently flexible so that their rear ends may be sprung together under certain conditions of operation hereafter explained.

When the drawbar 5 is moved rearwardly in the casing 6 so that the lugs 26 are behind the rear ends of the straps 20 the members will separate so that the forward edges of the lugs engage the straps. A wedge 27 is provided to enter the space between the rear ends of the members 5 and to retain the lugs 26 in engagement with the straps 20. The wedge 27 has a base 28 with openings through which headed bolts 29 extend, the bolts 29 also extending through inturned ears 18a on the ferrule 18 and are provided outside of the ears with nuts 30. Springs 31 surround the bolts 29 and yieldably thrust the wedge forward but permit its rearward movement within a limited range.

When the drawbar 5 is in its rearward position with its rear ends spread and the lugs 26 in engagement with the rear ends of the strap 20 and the wedge 27 inserted between the separated rear ends of the members 5, which is the normal pulling position of the parts, the load of the tractor is transmitted through the drawbar 5 and through the straps 20 to the collar 15 and thence will be cushioned by the spring 16 and transmitted through the stops 17 to the casing 6 which is attached to the implement. The parts are shown in this position in Figs. 4 and 5.

The normal pull upon the drawbar will compress the spring 16 to some extent moving the drawbar and its associated parts forwardly in the casing and so long as the load is within the normal range and the spring is not abnormally compressed the wedge 27 will follow the movement of the drawbar and remain between its rear separated ends by action of the springs 31. The nuts 30 on the bolts 29 regulate the distance which the wedge 27 may move to follow movement of the drawbar.

If an abnormal load is put upon the hitch the drawbar will move forward beyond its normal range of movement abnormally compressing the spring 16 and moving the drawbar forwardly beyond the point where the wedge 27 may follow its movement and thus withdrawing the wedge from between its rear separated ends as illustrated in Fig. 6. When the wedge 27 is withdrawn the strain of the load is too great for the rear ends of the drawbar to hold themselves separated and to hold the lugs 26 in engagement with the straps 20 of their own accord and the lugs 26 will slip inwardly from the straps and disengage therefrom and permit the drawbar to move forwardly in the casing, this movement being permitted to continue until the lugs 26 engage the shoulders 23 from the forward end of the straps 20. These shoulders form the forward limit stops of the drawbar and in this position any tendency of the drawbar to continue to pull its load will be transmitted through the straps and the collar 15 and cushioned through the spring 16 to the casing 6 the same as in the rearward or normal position of the parts.

Rearward movement of the drawbar in the housing sufficient to move the lugs 26 rearwardly of the rear ends of the straps 20 will first retract the wedge 27 compressing the springs 31, and the rear ends of the drawbar 5, by their natural resilience, will spread and locate the lugs 26 behind the straps 20 whereupon the springs 31 will act to thrust the wedge 27 between the rear ends of the drawbar 5 which places the parts again in normal pulling position.

To disengage the clutch a clutch throw-out anchor 40 is provided, being located between the members of the drawbar 5 near its forward end. These members of the drawbar being formed of channel members with the channels turned inwardly form the desired space between them to receive the anchor 40. A cable 41 is attached at one end to the anchor 40 and extends forwardly through the drawbar and outside thereof and its opposite end is attached to the clutch throw-out lever 10. In the arrangement illustrated in Fig. 1 the cable 41 passes under a guide pulley 42.

The anchor 40 has a blunt or square forward end with a nose 43, the rear surface of which is inclined at 44 to serve as a cam surface. A longitudinal slot 45 is provided between the members of the drawbar 5 through which the nose 43 of the anchor extends. The rear end of the anchor is provided with a tail piece 46 which holds the rear end in place between the members 5 of the drawbar and the lower surface of the anchor is provided with a leaf spring 47 which tends to yieldably thrust the nose 43 outwardly. A retaining pin 48 projects from the lower surface of the anchor near its forward edge.

The slot 45 is of limited length for the purposes hereafter described and two longitudinally spaced apart slots or openings 49 and 50 are provided between the members 5 of the drawbar at the side opposite the slot 45 to receive the retaining pin 48. The normal position of the anchor 40, when the parts of the hitch are in position for normal pulling, is with its nose 43 thrust outwardly through the slot and in engagement with the forward end thereof and also through an opening 51 in the casing 6 near the forward end thereof. The opening 51 is elongated longitudinally of the casing sufficiently to permit movement of the nose of the anchor therein within the normal range of movement of the drawbar within the casing by action of the cushion spring 16. In this position the cable 41 extends with reasonable tautness between the anchor 40 and the clutch lever and so long as the anchor remains in this position relative to the drawbar no pull upon the cable occurs and the clutch lever is not disturbed.

As previously stated, the description of the device is first made with relation to the modification for actuating the snap type clutch lever illustrated in Fig. 1 and in this modification the retaining pin 48 has its lower end inclined forwardly as illustrated in Figs. 4, 7, 8 and 9. When an obstacle is engaged by the implement and exerts sufficient abnormal load to disengage the hitch the drawbar will move forwardly in the casing and the forward end of the nose 43 of the anchor will strike the forward end of the opening 51 in the casing and movement of the drawbar in the casing will then cause the anchor 40 to be moved backwardly in the drawbar pulling on the cable 41.

This movement of the anchor in the drawbar will continue until the rear end of the slot 45 in the drawbar engages the rear inclined surface 44 of the anchor which will cam the nose 43 inwardly removing it from the opening 51 of the casing and at the same time inserting the retaining pin 48 in the rear slot 50 of the drawbar as shown in Fig. 8.

The anchor will remain thus depressed until its nose 43 emerges from the end of the casing 6 and during this movement the cable 41 has been pulled sufficiently to move the clutch lever 10 to a clutch disengaging position in which the lever is held by action of the spring 13. As the nose 43 passes outside the casing 6 action of the spring 47 again thrusts the anchor upwardly removing the pin 48 from the slot 50 and leaving the anchor free to move forwardly in the drawbar. This renders the clutch disengaging means ineffective and permits the clutch lever to be moved forwardly again into clutch engaging position. In this action the forwardly inclined end of the pin 48 insures ready release from the slot 50.

Upon return movement of the drawbar into the casing the pin 48, which has been moved away from the slot 50 by manual movement of the clutch lever 10 to reengage the clutch engages the inner surface of the drawbar and holds the nose 43 of the anchor projecting outwardly beyond the drawbar and this nose is engaged by the end of the casing 6 as the drawbar moves inwardly which moves the anchor forwardly in the drawbar until the nose of the anchor strikes the forward end of the slot 45 in which position the pin 48 is opposite the slot 49 in the drawbar and continued rearward movement of the drawbar cams the nose of the anchor inwardly so that it may pass inside of the casing and then again spring outwardly by action of the spring 47 into the opening 51.

Figure 2:
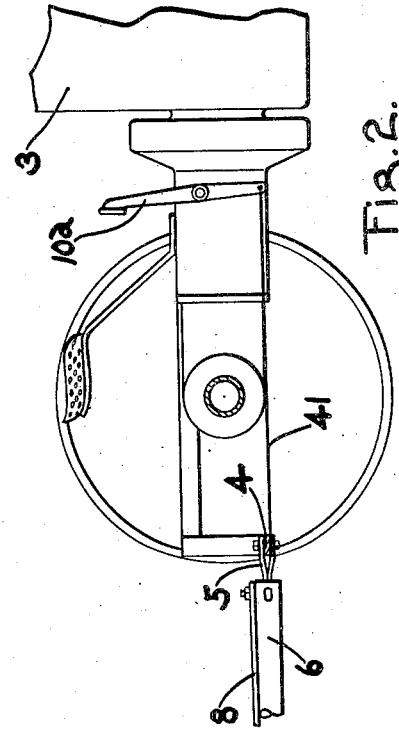
Fig. 2 is a fragmentary diagrammatic elevation of the rear portion of a tractor having the automobile type of clutch lever and showing the front portion of the tractor stop hitch attached thereto.
Figure 3:
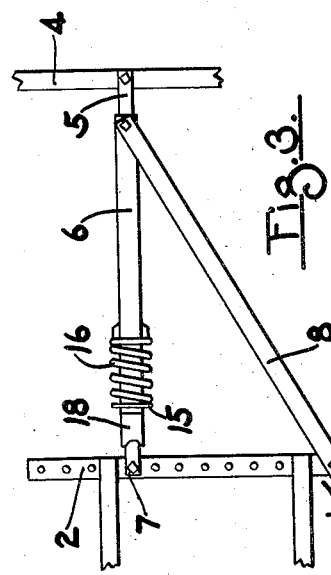
Fig. 3 is a plan view of the tractor hitch shown attached to fragments of the tractor and plow.

A slightly different action must occur in disengaging the automobile type of clutch illustrated in Fig. 2. Inasmuch as this clutch has a constant tendency to reengage itself the clutch lever 10a must be held in disengaged position by constant tension upon the cable 41 until the operator of the tractor is ready to manually operate it. To actuate this type of clutch the forward end of the retaining pin 48 is straight as illustrated in Fig. 12. This figure illustrates a rear inclination of the pin 48 but this is only an illustration of a reversal of the pin from the position shown in Fig. 7 etc., by means of which the same pin may be used for either type of clutch merely by reversing the front for rear. If desired a perfectly straight pin without any inclination may be used for the automobile type clutch.

With a straight pin, and in operating the automobile type clutch, the action of the parts is similar to that as described for the inclined pin excepting that when the nose 43 of the anchor has been depressed to emerge from the casing 6 moving the pin 48 into the slot 50 the pull on the cable 41 of the clutch lever 10a offers sufficient frictional resistance to hold the pin 48 against the forward end of the slot 50 and resists the tendency of the spring 47 to raise the anchor.

Thus the anchor 40 is held in its rearward moved position in the drawbar 5 and holds the clutch lever in clutch disengaged position. When the operator is ready to take control of the tractor he depresses the clutch pedal a trifle farther than it has been pulled by the cable 41 releasing the tension on the cable and hence the frictional resistance of the pin 48 against the slot 50 and permitting the spring 47 to release the pin from the slot and freeing it to move forwardly in the drawbar thus permitting the clutch lever to be moved to clutch engaging position.

Return movement of the parts with the straight pin 48 in use is the same as described with the forwardly inclined pin.

Operation

First considering operation of the device applied to a tractor having the snap type clutch throw-out lever and assuming that the hitch is in normal pulling position as illustrated in Figs. 1, 4 and 5.

The tractor exerts its pull on the drawbar 5 which in turn pulls against the rear ends of the straps 20 through the lugs 26 against the collar 15 and the load is transmitted through the cushion spring 16 to the casing 6 which is connected to the implement 1. During normal operation while the implement is exerting normal resistance in being pulled the spring 16 will yield to some extent permitting limited longitudinal movement of the drawbar in the casing.

In this limited normal movement of the drawbar in the casing the wedge 27 will follow movement on the drawbar by action of the springs 31 behind it and by virtue of the clearance between the nuts 30 on the bolts 29 and the lugs 18a on the ferrule 18 thus permitting the wedge to hold the rear ends of the drawbar separated and maintain the lugs 26 in engagement with the straps 20.

Also, during this normal movement of the drawbar in the casing, the anchor 40 will remain against the forward end of the slot 45 in the drawbar, its nose 43 moving within the opening 51 in the casing, and will not exert any pulling effort upon the cable 41 nor the clutch throw-out lever 10. Therefore, so long as the hitch parts remain in normal position the tractor may be actuated to pull the implement and the clutch may be disengaged manually at will and reengaged as required for such operation.

If the implement strikes an obstacle in the field which exerts an abnormal pull upon the hitch the spring 16 will yield beyond its normal range permitting the rear ends of the drawbar to move forwardly beyond the position where the wedge 27 can follow its movement. The extent to which the drawbar may travel without disengagement of the wedge 27 is adjusted by the position of the nuts 30 on the bolts 29 and thereby the amount of tension required to "trip" the hitch is adjustable. When the nuts 30 engage the lugs 18a the wedge can travel forwardly no farther and further movement of the drawbar pulls the wedge from between its separated rear ends permitting them to move inwardly and the lugs 26 to disengage from the rear ends of the straps 20 thus freeing the drawbar to move forwardly in the casing and its forward end to extend therefrom.

As the drawbar moves forwardly in the casing following the movement of the tractor after the implement has been stopped by the obstacle, the nose 43 of the anchor 40 engages the forward end of the opening 51 in the casing preventing further movement of the anchor and as the tractor and drawbar move forward, with the anchor remaining stationary with the casing, tension is put upon the cable 41 which pulls the clutch lever 10 into clutch disengaging position. As the drawbar continues its outward movement in the casing the rear end of the slot 45 engages the inclined surface 44 of the anchor and cams its nose 43 inwardly causing the retaining pin 48 to enter the slot 50 which has been moved to a position opposite said pin.

This inward movement of the nose 43 moves it inside of the casing 6 releasing it from the end of the opening 51 and carrying the anchor forwardly in the casing and as its nose emerges from the end thereof the spring 47 will again thrust the nose outwardly removing the pin 48 from the slot 50. This movement of the anchor has been sufficient to move the clutch lever 10 to clutch disengaged position in which it is held by the spring 13 and the anchor 40 is now free in the drawbar 5 and ineffective and may move forwardly with its nose projecting through the slot 45.

It is assumed that the tractor will have attained sufficient momentum to tend to move it beyond the limit of extension of the hitch after the clutch has been disengaged but in the extreme forward movement of the drawbar the lugs 26 will engage the shoulders 23 at the forward ends of the straps 20 forcibly stopping further movement of the tractor, this stopping pull being cushioned by the spring 16 to which the rear ends of the straps 20 exert their pull through the collar 15.

Thus an obstacle which will stop movement of the implement will first cause disengagement of the hitch permitting extension thereof and during such extension the tractor clutch is disengaged which ceases the pulling effort of the tractor and finally the forward movement of the tractor is positively stopped by cushion action of the spring 16 when the hitch reaches the limit of its extensibility.

It is presumed that before resuming operation to pull the implement it will be disengaged from the obstacle which it encountered. To resume operation the tractor is reversed which requires reengagement of the clutch and this may be done by movement of the clutch lever 10 inasmuch as the anchor to which it is connected by the cable 41 has been freed to permit such movement as explained.

Reverse movement of the tractor moves the drawbar 5 into the casing and during such movement the projecting nose 43 of the anchor engages the end of the casing 6 moving the anchor forwardly in the drawbar until the pin 48 is opposite the slot 49 and the nose engages the end of the slot 45 nearest the tractor whereupon action of the end of the casing against the cam surface 44 of the anchor moves the nose inwardly so that it may move into the casing and thence be thrust outwardly by the spring 27 into the opening 51 thereof.

Also during this return movement the rear ends of the drawbar are moved to a position where the lugs 26 are behind the rear ends of the straps 20 which will cause them to engage and depress the wedge 27 compressing the springs 31 and upon reaching this position the resiliency of the members of the drawbar causes their rear ends to spread to place the lugs 26 behind the straps 20 thus opening a space between the members 5 and permitting the wedge 27 to be thrust forwardly into that space by action of the springs 31. This completes the replacement of the hitch parts into normal pulling position after which the tractor may again be moved forwardly to draw the implement.

In operation with a tractor having the automobile type of clutch illustrated in Fig. 2 the action is the same as disclosed for the snap type clutch excepting that when the nose of the anchor 43 has been depressed upon extending movement of the drawbar 5 the pin 48, having a straight forward edge engages the forward edge of the slot 50 as illustrated in Fig. 12 and the pull of the cable 41 exerts sufficient frictional resistance between the pin 48 and the end of the slot 50 to prevent the spring 47 moving the forward end of the anchor outwardly and thus the anchor is held in its rearward position in the drawbar and maintains the clutch lever 10a in clutch disengaged position.

When it is desired to move the clutch lever 10a to clutch engaging position the operator depresses the clutch pedal far enough to release the tension on the cable 41 which releases the frictional resistance between the pin 48 and the end of the slot 50 and permits the spring 47 to move the forward end of the anchor 40 upwardly and remove the pin 48 from the slot 50 thus freeing the anchor to move forwardly in the drawbar and to permit engagement of the clutch. All other operations of the device modified for the automobile type of clutch are the same as those described for the device operating with the snap type of clutch lever.

The invention is defined in the appended claims and is to be considered comprehensive of all forms of structure coming within their scope.

I claim:

1. The combination with a tractor having a clutch and a drawn implement, of a hitch structure connecting the tractor with the drawn implement, comprising draft members, one being a pulling member connected to a tractor and the other being a pulled member connected to the implement, interlocking means for connecting the draft members to each other, means for disconnecting said draft members when said draft members are subjected to abnormal strain, means associated with said clutch and actuated by said pulled member to disengage the clutch after the draft members are disconnected, and means actuated by movement of said members relative to each other to render the clutch operating means ineffective after the clutch is disengaged.

2. The combination with a tractor having a clutch operating lever and a drawn implement, of a hitch connecting the tractor and the implement and comprising members extensible relative to each other under abnormal load, and a clutch disengaging mechanism associated with said hitch structure and connected with said clutch lever, said clutch disengaging mechanism comprising means acting to positively disengage said clutch during the first part of extension of said hitch and means to stop operation of said clutch disengaging mechanism at a predetermined point in said extension movement.

3. The elements in combination defined in claim 2, combined with means associated with said clutch disengaging mechanism for holding said clutch in disengaged position after its disengaging movement has stopped.

4. The elements in combination defined in claim 2, combined with means associated with said clutch disengaging mechanism for holding said clutch in disengaged position after its disengaging movement has stopped, and means for releasing said retaining means actuated by further disengaging movement of said clutch lever.

5. The elements in combination defined in claim 2, combined with means for automatically resetting said clutch disengaging members into normal position actuated by retracting movement of said hitch.

6. The combination with a tractor having a clutch and a drawn implement, of a hitch comprising, a pulling member connected to the tractor and a pulled member connected to the implement, said members being movable relative to each other, means for connecting said members together for pulling said implement by said tractor under normal load, said means being disconnectable to release said members from each other under abnormal load, a clutch disengaging anchor connected to said pulled member, means for connecting said anchor with said clutch, and means for moving said anchor relative to said pulled member and in the direction of movement of said tractor after said pulled and pulling members have moved a predetermined distance relative to each other.

7. The elements in combination defined in claim 6 combined with manually controlled means for moving said anchor relative to both said pulled and pulling members toward said tractor.

8. The combination with a tractor having a clutch and a tractor implement, of a hitch comprising a pulling member connected to the tractor and a pulled member connected to the implement, means for connecting said members together for pulling said implement by said tractor under normal load, means for disconnecting said members under abnormal load so that they may move relative to each other, a clutch disengaging anchor, means for connecting said anchor to said clutch, means for connecting said anchor to said pulled member so that it will remain stationary therewith, and automatic means acting to transfer the connection of said anchor from said pulled member to said pulling member after said pulled and pulling members have moved a predetermined distance relative to each other.

9. The elements in combination defined in claim 8 combined with manually controlled means for releasing said anchor from its connection with said pulling member.

10. The elements in combination defined in claim 8 combined with means for automatically returning said anchor to normal position for connection with said pulled member actuated by reverse movement of said pulled and pulling members to normal position.

11. The elements in combination defined in claim 8, combined with means for disconnecting said anchor from said pulling member upon further movement of said pulled and pulling members relative to each other after said connection of said anchor has been transferred from the pulled member to the pulling member.

12. The combination with a tractor having a clutch and an implement, of a hitch comprising, a pulling member connected to the tractor and a pulled member connected to the implement, means for connecting said members together for pulling said implement by said tractor under normal load, means for disconnecting said members under abnormal load so that they may move relative to each other, a clutch disengaging anchor, means for connecting said anchor to said clutch, means for connecting said anchor to said pulled member, and means actuated by movement of said pulled and pulling members relative to each other to disconnect said anchor from said pulled member after said pulled and pulling members have moved a predetermined distance relative to each other.

13. The combination with a tractor having a clutch operating lever movable to clutch engaging and clutch disengaging positions, and a drawn implement, of a hitch connecting the tractor and the implement comprising, members extensible relative to each other under abnormal load, and a clutch disengaging mechanism associated with said hitch structure and connected with said clutch lever, said clutch disengaging mechanism comprising means acting to move said clutch operating lever to clutch disengaging position during the first part of extension of said hitch and means acting to automatically release said clutch operating lever at a predetermined point of extension of said hitch to enable said clutch operating lever to be moved to clutch engaging position.

14. The combination with a tractor having a clutch and a drawn implement, comprising a pulling member connected with the tractor and a pulled member connected with the implement, means for connecting said members together in normal position for normal pulling load, said connecting means acting to permit movement of said members relative to each other under abnormal load, means connected to said clutch and having a normal position and movable out of said normal position to disengage said clutch by movement of said hitch members relative to each other, and means for automatically re-setting said clutch disengaging means into normal position by movement of said hitch members into normal position.

15. The combination with a tractor having a clutch and a drawn implement, of a hitch structure connecting the tractor with the drawn implement comprising draft members, one being a pulling member connected to the tractor and the other being a pulled member connected to the implement, means for connecting said members together for normal pulling load, said means permitting movement of said members relative to each other under abnormal load, means associated with said clutch and actuated by movement of said members relative to each other to disengage the clutch, and means actuated by movement of said members relative to each other to render the clutch operating means ineffective after the clutch is disengaged.

16. The combination with a tractor having a clutch and a drawn implement, of a hitch comprising a pulling member connected to the tractor and a pulled member connected to the implement, said members being movable relative to each other, means for connecting said members together for pulling said implement by said tractor under normal load, said connecting means permitting said members to move relative to each other under abnormal load, a clutch disengaging anchor connected to said pulled member, means for connecting said anchor to said clutch and means for moving said anchor relative to said pulled member and in the direction of movement of said tractor after said pulled and pulling members have moved a predetermined distance relative to each other.

17. The elements in combination defined in claim 16 combined with manually controlled means for moving said anchor relative to both said pulled and pulling members toward said tractor.

18. The combination with a tractor having a clutch and a drawn implement, of a hitch comprising a pulling member connected to the tractor and a pulled member connected to the implement, means for connecting said members together for pulling said implement by said tractor under normal load, said connected means acting to permit movement of said members relative to each other under abnormal load, a clutch disengaging anchor, means for connecting said anchor to said pulled member so that it will remain stationary therewith, and automatic means acting to transfer the connection of the said anchor from said pulled member to said pulling member after said pulled and pulling members have moved a predetermined distance relative to each other.

19. The elements in combination defined in claim 18 combined with manually controlled means for releasing said anchor from said connection with said pulling member.

20. The elements in combination defined in claim 18 combined with means for automatically returning said anchor to normal position for connection with said pulled member actuated by reverse movement of said pulled and pulling members to normal position.

21. The elements in combination defined in claim 18 combined with means for disconnecting said anchor from said pulled member upon further movement of said pulled and pulling members relative to each other after said connection of said anchor has been transferred from the pulled member to the pulling member.

22. The combination with a tractor having a clutch and an implement, of a hitch comprising a pulling member connected to the tractor and a pulled member connected to the implement, means for connecting said members together for pulling said implement with said tractor under normal load, said means acting to permit said members to move relative to each other under abnormal load, a clutch disengaging anchor, means for connecting said anchor to said clutch, means for connecting said anchor to said pulled member and means actuated by movement of said pulled and pulling members relative to each other to disconnect said anchor from said pulled member after said pulling and pulled members are moved a predetermined distance relative to each other.

GERRIT DEN BESTEN.